United States Patent
Suzuki et al.

(10) Patent No.: US 10,711,720 B2
(45) Date of Patent: Jul. 14, 2020

(54) CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Kazuya Suzuki, Susono (JP); Norihisa Nakagawa, Susono (JP); Koji Miwa, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 16/013,429

(22) Filed: Jun. 20, 2018

(65) Prior Publication Data
US 2019/0072049 A1     Mar. 7, 2019

(30) Foreign Application Priority Data
Sep. 5, 2017   (JP) ................................. 2017-170020

(51) Int. Cl.
*F02D 41/06*       (2006.01)
*F01N 3/10*       (2006.01)
(Continued)

(52) U.S. Cl.
CPC .......... *F02D 41/062* (2013.01); *B60W 20/16* (2016.01); *F01N 3/101* (2013.01); *F01N 9/00* (2013.01);
(Continued)

(58) Field of Classification Search
CPC .. F02D 41/062; F02D 41/1454; F02D 41/042; F02D 41/0295; F02D 35/0092;
(Continued)

(56) References Cited

U.S. PATENT DOCUMENTS 4,509,489 A * 4/1985 Hasegawa ........... F02D 41/1491
                                                                                          123/680
4,621,600 A * 11/1986 Hasegawa ............. F02D 41/123
                                                                                          123/198 D
(Continued)

FOREIGN PATENT DOCUMENTS

EP       1201477 A2    5/2002
EP       2599679 A1    6/2013
(Continued)

*Primary Examiner* — Joseph J Dallo
(74) *Attorney, Agent, or Firm* — Oliff PLC (57) ABSTRACT

In a control system for an internal combustion engine, the internal combustion engine includes a first exhaust catalyst that is a three-way catalyst disposed in an exhaust path of the internal combustion engine, a second exhaust catalyst that is a three-way catalyst disposed in the exhaust path on a downstream side of the first exhaust catalyst, and a motor configured to drive the internal combustion engine. The control system includes an electronic control unit configured to, when operation of the internal combustion engine is stopped, stop fuel injection in the internal combustion engine and then, execute motoring in which the internal combustion engine is rotationally driven using drive power of the motor, and execute the motoring in a range in which an oxygen occlusion amount of the first exhaust catalyst becomes an oxygen occlusion amount smaller than an upper limit oxygen occlusion amount of the first exhaust catalyst.

5 Claims, 6 Drawing Sheets

(51) Int. Cl.

| | | |
|---|---|---|
| *F01N 13/00* | (2010.01) | |
| *F02D 41/02* | (2006.01) | |
| *F01N 9/00* | (2006.01) | |
| *B60W 20/16* | (2016.01) | |
| *F02D 41/04* | (2006.01) | |
| *F02D 41/14* | (2006.01) | |
| *F02D 25/04* | (2006.01) | |
| *F02D 35/00* | (2006.01) | |
| *F02N 11/08* | (2006.01) | |

(52) U.S. Cl.
CPC .......... *F01N 13/0093* (2014.06); *F02D 25/04* (2013.01); *F02D 35/0092* (2013.01); *F02D 41/0295* (2013.01); *F02D 41/042* (2013.01); *F02D 41/1454* (2013.01); *F01N 2430/06* (2013.01); *F01N 2590/11* (2013.01); *F01N 2900/08* (2013.01); *F01N 2900/1602* (2013.01); *F01N 2900/1624* (2013.01); *F02D 2200/0814* (2013.01); *F02D 2250/36* (2013.01); *F02N 11/0814* (2013.01)

(58) Field of Classification Search
CPC ............ F02D 25/04; F02D 2200/0814; F02D 2250/36; F02D 41/123; F02D 41/027; F02D 29/02; F02D 17/00; B60W 20/16; F01N 9/00; F01N 13/0093; F01N 3/101; F01N 2900/1602; F01N 2900/08; F01N 2900/1624; F01N 2590/11; F01N 2430/06; F02N 11/0814

See application file for complete search history.

(56) References Cited

U.S. PATENT DOCUMENTS

| | | | |
|---|---|---|---|
| 6,560,960 B2* | 5/2003 | Nishimura | F01N 3/0842 123/399 |
| 2001/0011455 A1* | 8/2001 | Harima | F01N 3/05 60/288 |
| 2005/0262831 A1* | 12/2005 | Shouda | F02D 41/126 60/285 |
| 2006/0218894 A1* | 10/2006 | Miwa | B60K 6/445 60/277 |
| 2007/0125347 A1* | 6/2007 | Nakagawa | F01N 3/101 123/672 |
| 2012/0291423 A1 | 11/2012 | Nakagawa et al. | |
| 2016/0144318 A1* | 5/2016 | Choi | F02D 41/0235 123/676 |

FOREIGN PATENT DOCUMENTS

| | | | |
|---|---|---|---|
| JP | 2003-148200 A | | 5/2003 |
| JP | 2007276692 A | * | 10/2007 |
| JP | 2010-007532 A | | 1/2010 |
| JP | 2015-017573 A | | 1/2015 |

* cited by examiner

CONTROL SYSTEM FOR INTERNAL COMBUSTION ENGINE

INCORPORATION BY REFERENCE

The disclosure of Japanese Patent Application No. 2017-170020 filed on Sep. 5, 2017 including the specification, drawings and abstract is incorporated herein by reference in its entirety.

BACKGROUND

1. Technical Field

The present disclosure relates to a control system for an internal combustion engine.

2. Description of Related Art

Japanese Unexamined Patent Application Publication No. 2010-007532 (JP 2010-007532 A) discloses a technology in which when the operation of an internal combustion engine is stopped, motoring is performed by driving a starter motor after a stoppage of fuel injection, thereby forming a flow of air toward an exhaust path from an intake path and purging residual gas in the exhaust path. In the technology disclosed in JP 2010-007532 A, when the oxygen concentration detected by a sensor disposed in the exhaust path reaches the atmospheric oxygen concentration after the start of purging by motoring, motoring is stopped by determining that purging is completed.

Japanese Unexamined Patent Application Publication No. 2015-17573 discloses a stop & start technology in which an internal combustion engine is stopped from idling in a case where a predetermined stop & start condition is established.

SUMMARY

A three-way catalyst may be disposed as an exhaust catalyst in an exhaust path of an internal combustion engine. In the three-way catalyst, the exhaust control function of the three-way catalyst may be decreased when hydrocarbon (HC) poisoning (hereinafter, referred to as HC poisoning) that is bonding of hydrocarbon in exhaust gas, or sulfur poisoning (hereinafter, referred to as S poisoning) that is bonding of sulfur components in exhaust gas is caused. In a case where the operation of the internal combustion engine in which the three-way catalyst is disposed in the exhaust path is stopped, when motoring is performed in a state where fuel injection is stopped, oxygen is supplied to the three-way catalyst. When oxygen is supplied to the three-way catalyst, the HC poisoning or S poisoning caused in the three-way catalyst can be resolved. Consequently, removal (oxidation) of HC or CO in the three-way catalyst at the restart of the internal combustion engine can be promoted.

However, when oxygen is supplied to the three-way catalyst by motoring at the time of stopping the operation of the internal combustion engine, an excess of oxygen that is not consumed to resolve the HC poisoning or S poisoning is occluded in the three-way catalyst. Accordingly, when motoring is performed, an oxygen occlusion amount of the three-way catalyst is increased. When fuel injection is resumed at the restart of the internal combustion engine, air is present in the exhaust path. Thus, immediately after the restart of the internal combustion engine (that is, immediately after the resumption of fuel injection), exhaust gas discharged from the internal combustion engine flows to the three-way catalyst while being mixed with air present in the exhaust path on the upstream side of the three-way catalyst. Consequently, exhaust gas having a lean air-fuel ratio higher than the stoichiometric air-fuel ratio flows to the three-way catalyst. Immediately after the restart of the internal combustion engine, when exhaust gas having a lean air-fuel ratio flows to the three-way catalyst of which the oxygen occlusion amount is increased by motoring at the time of stopping the operation of the internal combustion engine, the NOx removal function (NOx reduction function) of the three-way catalyst cannot be sufficiently exhibited, and NOx may be discharged.

The present disclosure provides a control system for an internal combustion engine in order to accomplish removal of HC or CO and removal of NOx at the same time immediately after the start of the internal combustion engine in which a three-way catalyst is disposed in an exhaust path.

An aspect of the present disclosure relates to a control system for an internal combustion engine. The internal combustion engine includes a first exhaust catalyst that is a three-way catalyst disposed in an exhaust path of the internal combustion engine, a second exhaust catalyst that is a three-way catalyst disposed in the exhaust path on a downstream side of the first exhaust catalyst, and a motor configured to drive the internal combustion engine. The control system includes an electronic control unit configured to, when operation of the internal combustion engine is stopped, stop fuel injection in the internal combustion engine and then, execute motoring in which the internal combustion engine is rotationally driven using drive power of the motor, and execute the motoring in a range in which an oxygen occlusion amount of the first exhaust catalyst becomes an oxygen occlusion amount smaller than an upper limit oxygen occlusion amount of the first exhaust catalyst.

According to the aspect of the present disclosure, the first exhaust catalyst and the second exhaust catalyst are serially arranged in the exhaust path of the internal combustion engine. Each of the first exhaust catalyst and the second exhaust catalyst is a three-way catalyst. When the operation of the internal combustion engine is stopped, fuel injection in the internal combustion engine is stopped, and then, the motoring in which the internal combustion engine is rotationally driven using the drive power of the motor is executed. Accordingly, since oxygen is supplied to the first exhaust catalyst, HC poisoning or S poisoning in the first exhaust catalyst is resolved. Consequently, removal of HC or CO in the first exhaust catalyst at the restart of the internal combustion engine can be promoted.

Of the oxygen supplied to the first exhaust catalyst by the motoring executed in a state where fuel injection in the internal combustion engine is stopped, an excess of oxygen that is not consumed to resolve the HC poisoning or S poisoning in the first exhaust catalyst is occluded in the first exhaust catalyst. In such a case, according to the aspect of the present disclosure, the motoring is executed in a range in which the oxygen occlusion amount of the first exhaust catalyst that is increased by the motoring becomes an oxygen occlusion amount smaller than the upper limit oxygen occlusion amount of the first exhaust catalyst. Accordingly, a situation where oxygen flows out to the downstream side of the first exhaust catalyst due to the motoring is suppressed. That is, even when the motoring is executed at the time of stopping the operation of the internal combustion engine, oxygen is not supplied to the second exhaust catalyst. Thus, an increase in the oxygen occlusion amount of the second exhaust catalyst can be suppressed. Accordingly, immediately after the restart of the internal combustion engine, even when the NOx removal function of the first exhaust catalyst is not sufficiently exhibited, NOx that flows out from the first exhaust catalyst can be removed by the second exhaust catalyst.

According to the aspect of the present disclosure, removal of HC or CO in the first exhaust catalyst immediately after the start of the internal combustion engine can be promoted, and NOx can be removed by the second exhaust catalyst immediately after the start of the internal combustion engine. That is, removal of HC or CO and removal of NOx immediately after the start of the internal combustion engine can be accomplished at the same time.

When the temperature of the first exhaust catalyst is relatively high, and oxygen is supplied to the first exhaust catalyst by the motoring executed in a state where fuel injection in the internal combustion engine is stopped, the temperature of the first exhaust catalyst may be excessively increased due to oxidation reactions in the first exhaust catalyst. In a case where the temperature of the first exhaust catalyst is relatively high, it is highly likely that the HC poisoning or S poisoning in the first exhaust catalyst is resolved. In the control system according to the aspect of the present disclosure, the electronic control unit may be configured to, when the operation of the internal combustion engine is stopped, prohibit the motoring in a case where a temperature of the first exhaust catalyst at a time of the stoppage of fuel injection in the internal combustion engine is higher than a predetermined temperature. In such a case, the predetermined temperature is a temperature at which a determination can be made that the temperature of the first exhaust catalyst is not excessively increased even when oxygen is supplied to the first exhaust catalyst by the motoring. With such a control, a situation where the temperature of the first exhaust catalyst is excessively increased by the motoring executed when the operation of the internal combustion engine is stopped can be suppressed.

In the control system according to the aspect of the present disclosure, the electronic control unit may be configured to, when the internal combustion engine is restarted after the stoppage of the operation of the internal combustion engine, execute the motoring such that an engine rotational speed of the internal combustion engine is increased to a predetermined rotational speed before resumption of fuel injection in the internal combustion engine. The motoring executed when the internal combustion engine is restarted is for increasing the engine rotational speed of the internal combustion engine to the predetermined rotational speed before the resumption of fuel injection in the internal combustion engine.

When the motoring is executed at the restart of the internal combustion engine, oxygen is supplied to the first exhaust catalyst. In such a case, the oxygen occlusion amount of the first exhaust catalyst is increased by the amount of supplied oxygen. In the control system according to the aspect of the present disclosure, the electronic control unit may be configured to, when the operation of the internal combustion engine is stopped, execute the motoring such that the oxygen occlusion amount of the first exhaust catalyst becomes equal to a target oxygen occlusion amount. The electronic control unit may be configured to set the target oxygen occlusion amount to an amount smaller than an amount that is obtained by subtracting an estimated value of an amount of oxygen supplied to the first exhaust catalyst by the motoring executed at the restart of the internal combustion engine from the upper limit oxygen occlusion amount of the first exhaust catalyst.

By setting the target oxygen occlusion amount at the time of executing the motoring to such an amount, a situation where oxygen flows out to the downstream side of the first exhaust catalyst is suppressed even when the motoring is executed at the restart of the internal combustion engine. That is, a situation where oxygen is supplied to the second exhaust catalyst can be suppressed even when the motoring is executed. Thus, an increase in the oxygen occlusion amount of the second exhaust catalyst can be suppressed. Accordingly, immediately after the restart of the internal combustion engine, NOx that flows out from the first exhaust catalyst can be removed by the second exhaust catalyst. In a case where the target oxygen occlusion amount at the time of executing the motoring is set to such an amount, the oxygen occlusion amount of the first exhaust catalyst does not reach the upper limit oxygen occlusion amount of the first exhaust catalyst at the restart of the internal combustion engine. Thus, even when exhaust gas having a lean air-fuel ratio flows to the first exhaust catalyst immediately after the resumption of fuel injection in the internal combustion engine, at least a part of the amount of oxygen included in the exhaust gas is occluded in the first exhaust catalyst. Thus, the air-fuel ratio of exhaust gas flowing to the second exhaust catalyst can be set to be lower than the air-fuel ratio of exhaust gas flowing to the first exhaust catalyst.

Even when the motoring is executed such that the oxygen occlusion amount of the first exhaust catalyst becomes equal to the target oxygen occlusion amount, due to disturbance and the like, the oxygen occlusion amount of the first exhaust catalyst may reach the upper limit oxygen occlusion amount of the first exhaust catalyst before the resumption of fuel injection in the internal combustion engine, and oxygen may flow out from the first exhaust catalyst in actuality. In such a case, since oxygen is supplied to the second exhaust catalyst, the oxygen occlusion amount of the second exhaust catalyst is increased.

In the control system according to the aspect of the present disclosure, the internal combustion engine may include an air-fuel ratio sensor that detects an air-fuel ratio of gas in the exhaust path on the downstream side of the first exhaust catalyst and an upstream side of the second exhaust catalyst. In a case where the air-fuel ratio sensor is disposed in the exhaust path, the air-fuel ratio of gas detected by the air-fuel ratio sensor becomes higher than the stoichiometric air-fuel ratio when oxygen flows out from the first exhaust catalyst. In the control system according to the aspect of the present disclosure, the electronic control unit may be configured to set a fuel injection amount immediately after the resumption of fuel injection in the internal combustion engine in a case where the air-fuel ratio of gas detected by the air-fuel ratio sensor during a period from the stoppage of fuel injection in the internal combustion engine to the resumption of fuel injection for the restart of the internal combustion engine becomes higher than a predetermined threshold air-fuel ratio of a value equal to or higher than a stoichiometric air-fuel ratio, to an amount larger than the fuel injection amount immediately after the resumption of fuel injection in the internal combustion engine in a case where the air-fuel ratio of gas detected by the air-fuel ratio sensor during the period is maintained at the predetermined threshold air-fuel ratio or lower.

According to the aspect of the present disclosure, in a case where the oxygen occlusion amount of the second exhaust catalyst is increased due to oxygen flowing out from the first exhaust catalyst during the period from the stoppage of fuel injection in the internal combustion engine to the resumption of fuel injection for the restart of the internal combustion engine, the fuel injection amount immediately after the resumption of fuel injection in the internal combustion engine is increased compared to a case where oxygen does not flow out from the first exhaust catalyst during the period. Consequently, the air-fuel ratio of exhaust gas that flows to the second exhaust catalyst immediately after the resumption of fuel injection at the restart of the internal combustion engine is further decreased. Accordingly, in a case where oxygen flows out from the first exhaust catalyst before the resumption of fuel injection in the internal combustion engine, removal of NOx in the second exhaust catalyst immediately after the restart of the internal combustion engine can be promoted.

In the control system according to the aspect of the present disclosure, the electronic control unit may be configured to stop the operation of the internal combustion engine in a case where a predetermined operation stop condition is established, and restart the internal combustion engine in a case where a predetermined restart condition is established after the stoppage of the operation of the internal combustion engine. In a case where the control system for the internal combustion engine has such a configuration, the operation of the internal combustion engine is very frequently stopped and restarted. According to the aspect of the present disclosure, removal of HC or CO and removal of NOx immediately after the restart of the internal combustion engine performed very frequently can be accomplished at the same time.

According to the aspect of the present disclosure, removal of HC or CO and removal of NOx immediately after the start of the internal combustion engine can be accomplished at the same time.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, specific embodiments of the present disclosure will be described based on the drawings. The dimension, material, shape, relative arrangement, and the like of each constituent in the embodiments are not intended to limit the technical scope of the present disclosure thereto unless otherwise specified.

First Embodiment

Figure 1:
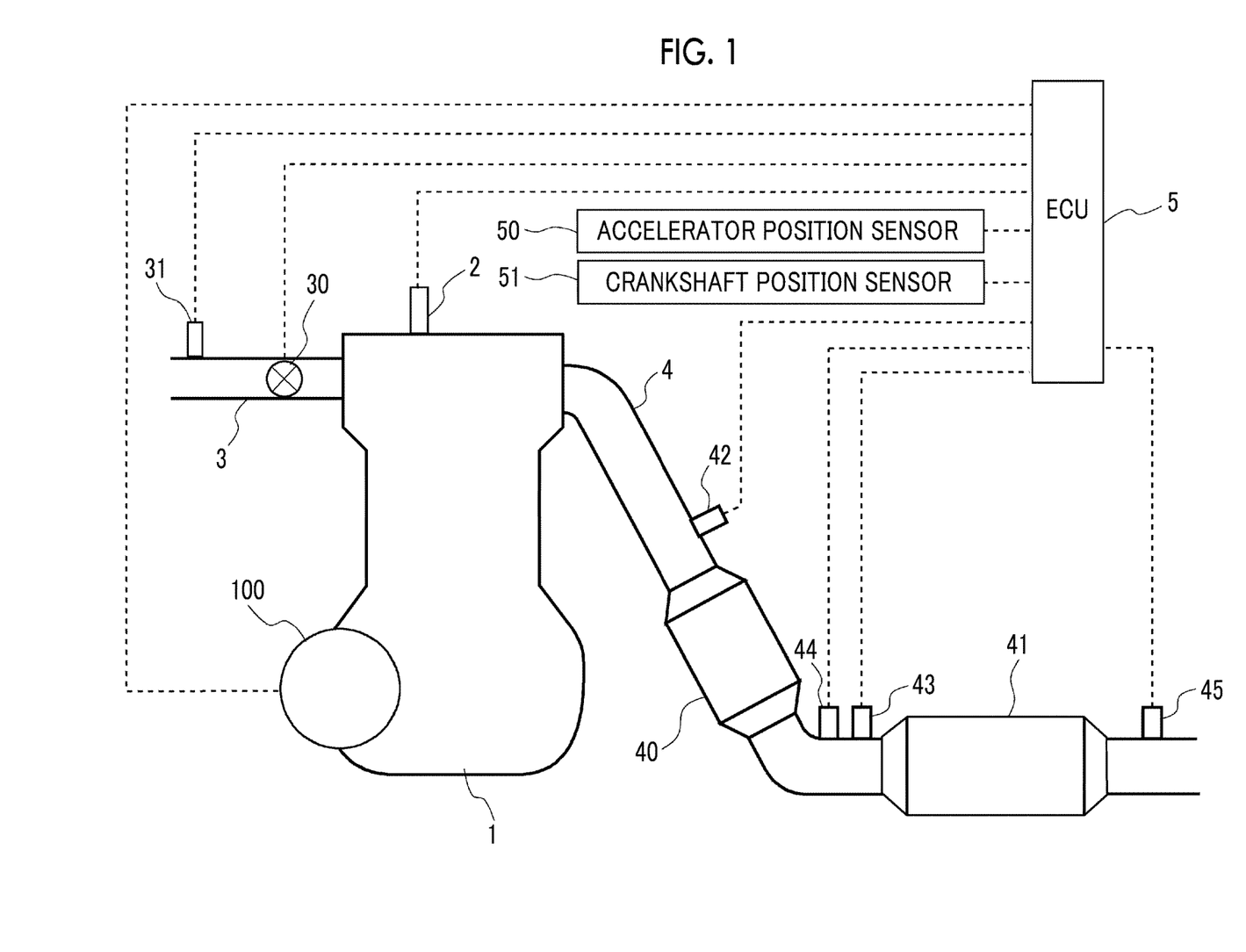
FIG. 1 is a diagram illustrating a schematic configuration of an internal combustion engine and an intake and exhaust system of the internal combustion engine according to an embodiment.

Schematic Configuration of Internal Combustion Engine and Intake and Exhaust System of Internal Combustion Engine FIG. 1 is a diagram illustrating a schematic configuration of an internal combustion engine and an intake and exhaust system of the internal combustion engine according to a first embodiment. An internal combustion engine 1 illustrated in FIG. 1 is a spark ignition gasoline engine for driving a vehicle. The internal combustion engine 1 includes a fuel injection valve 2 for supplying fuel into a cylinder (not illustrated). The fuel injection valve 2 may be configured to directly inject fuel into the cylinder, or may be configured to inject fuel into an intake port. An ignition plug (not illustrated) that ignites fuel (air-fuel mixture) in the cylinder is disposed in the internal combustion engine 1. A starter motor 100 for performing motoring in which a crankshaft (not illustrated) is rotationally driven is disposed in the internal combustion engine 1.

The internal combustion engine 1 is connected to an intake path 3 for circulating fresh air (air) to be taken into the cylinder. A throttle valve 30 that adjusts the amount of intake air of the internal combustion engine 1 by changing the channel cross-sectional area of the intake path 3 is disposed in the middle of the intake path 3. An air flow meter 31 for detecting the amount of intake air is disposed in the intake path 3 on the upstream side of the throttle valve 30.

The internal combustion engine 1 is connected to an exhaust path 4 for circulating burned gas (exhaust gas) discharged from the cylinder. In the middle of the exhaust path 4, a first exhaust catalyst 40 and a second exhaust catalyst 41 are serially arranged in this order from the upstream side along the flow of exhaust gas. Each of the first exhaust catalyst 40 and the second exhaust catalyst 41 is a three-way catalyst that has an oxygen occlusion function.

A first air-fuel ratio sensor 42 is disposed in the exhaust path 4 on the upstream side of the first exhaust catalyst 40. The first air-fuel ratio sensor 42 is a sensor that detects the air-fuel ratio of gas flowing to the first exhaust catalyst 40. A second air-fuel ratio sensor 43 and a first exhaust temperature sensor 44 are arranged in the exhaust path 4 between the first exhaust catalyst 40 and the second exhaust catalyst 41. The second air-fuel ratio sensor 43 is a sensor that detects the air-fuel ratio of gas flowing out from the first exhaust catalyst 40, that is, a sensor that detects the air-fuel ratio of gas flowing to the second exhaust catalyst 41. The first exhaust temperature sensor 44 is a sensor that detects the temperature of gas flowing out from the first exhaust catalyst 40, that is, a sensor that detects the temperature of gas flowing to the second exhaust catalyst 41. A second exhaust temperature sensor 45 is disposed in the exhaust path 4 on the downstream side of the second exhaust catalyst 41. The second exhaust temperature sensor 45 is a sensor that detects the temperature of gas flowing out from the second exhaust catalyst 41.

The internal combustion engine 1 having such a configuration is provided with an electronic control unit (ECU) 5. The ECU 5 is an electronic control unit that includes a central processing unit (CPU), a read-only memory (ROM), a random access memory (RAM), a backup RAM, and the like. Various sensors such as an accelerator position sensor 50 and a crankshaft position sensor 51 in addition to the air flow meter 31, the first air-fuel ratio sensor 42, the second air-fuel ratio sensor 43, the first exhaust temperature sensor 44, and the second exhaust temperature sensor 45 are electrically connected to the ECU 5. The accelerator position sensor 50 is a sensor that outputs an electric signal correlated to the operation amount of an accelerator pedal (accelerator operation amount) of a vehicle in which the internal combustion engine 1 is mounted. The crankshaft position sensor 51 is a sensor that outputs an electric signal correlated to the rotational position of an output shaft (crankshaft) of the internal combustion engine 1. The ECU 5 estimates the temperature of the first exhaust catalyst 40 based on the detected value of the first exhaust temperature sensor 44. The ECU 5 estimates the temperature of the second exhaust catalyst 41 based on the detected value of the second exhaust temperature sensor 45. The ECU 5 is electrically connected to various devices such as the fuel injection valve 2 and the starter motor 100. The ECU 5 controls the devices described above.

As described above, each of the first exhaust catalyst 40 and the second exhaust catalyst 41 has an oxygen occlusion function. Thus, in a case where oxygen that is not consumed in the oxidation of HC or CO is present in the first exhaust catalyst 40 and the second exhaust catalyst 41, the oxygen is occluded in the first exhaust catalyst 40 and the second exhaust catalyst 41. The ECU 5 estimates the oxygen occlusion amount of each of the first exhaust catalyst 40 and the second exhaust catalyst 41 as needed. The oxygen occlusion amount of each of the first exhaust catalyst 40 and the second exhaust catalyst 41 can be estimated based on the detected value of each of the air flow meter 31, the first air-fuel ratio sensor 42, and the second air-fuel ratio sensor 43.

Automatic Stop and Restart Control

The ECU 5 executes an automatic stop and restart control for stopping the operation of the internal combustion engine 1 in a case where a predetermined operation stop condition is established, and restarting the internal combustion engine 1 in a case where a predetermined restart condition is established after the stoppage of the operation of the internal combustion engine 1. Examples of the predetermined operation stop condition include a state where the accelerator operation amount detected by the accelerator position sensor 50 is equal to zero, a state where a brake pedal of the vehicle in which the internal combustion engine 1 is mounted is being stepped on (a brake switch (not illustrated) is in an ON state), a state where the traveling speed (vehicle speed) of the vehicle in which the internal combustion engine 1 is mounted is equal to or lower than a predetermined speed, and the like. When the predetermined operation stop condition is established, the ECU 5 stops the operation of the internal combustion engine 1 by executing a so-called fuel cut-off process that automatically stops fuel injection of the fuel injection valve 2. In the automatic stop and restart control, in a case where the predetermined operation stop condition is established, the fuel injection may be stopped after the amount of intake air of the internal combustion engine 1 may gradually be decreased by setting the opening degree of the throttle valve 30 to a smaller value and the engine rotational speed of the internal combustion engine 1 may be decreased to a predetermined injection stop speed by gradually decreasing the fuel injection amount of the fuel injection valve 2. In such a case, the predetermined injection stop speed may be set in accordance with the vehicle speed at the time of establishment of the predetermined operation stop condition.

When the established predetermined operation stop condition is not established after the stoppage of the operation of the internal combustion engine 1 (that is, during the execution of the fuel cut-off process), the predetermined restart condition is established. In a case where the predetermined restart condition is established, the ECU 5 restarts the internal combustion engine 1 by automatically resuming fuel injection of the fuel injection valve 2 (that is, finishing the execution of the fuel cut-off process). In such a case, after the predetermined restart condition is established, the ECU 5 performs motoring by driving the starter motor 100 before the resumption of fuel injection of the fuel injection valve 2. Fuel injection of the fuel injection valve 2 is resumed after the engine rotational speed (motoring rotational speed) of the internal combustion engine 1 is increased to a predetermined first rotational speed by motoring. Motoring that is executed at the restart of the internal combustion engine 1 may be referred to as "starting motoring" below. During the execution of the fuel cut-off process, ignition performed by the ignition plug in the internal combustion engine 1 may be stopped or may continue. In a case where ignition performed by the ignition plug is stopped during the execution of the fuel cut-off process, ignition performed by the ignition plug is resumed at the same time as the resumption of fuel injection of the fuel injection valve 2.

In the automatic stop and restart control according to the first embodiment, the ECU 5 executes motoring by driving the starter motor 100 even when the internal combustion engine 1 is stopped due to the establishment of the predetermined operation stop condition. Motoring that is executed at the time of stopping the operation of the internal combustion engine 1 may be referred to as "stopping motoring". The stopping motoring is executed after fuel injection of the fuel injection valve 2 is stopped (that is, after the execution of the fuel cut-off process is started).

When HC poisoning that is bonding of HC in exhaust gas, or S poisoning that is bonding of sulfur components in exhaust gas is caused in the first exhaust catalyst 40, the exhaust control function of the first exhaust catalyst 40 may be decreased. The HC poisoning or S poisoning may also be caused in the second exhaust catalyst 41. However, since the first exhaust catalyst 40 is disposed on the upstream side of the second exhaust catalyst 41 in the exhaust path 4, a decrease in exhaust control function caused by the poisoning more easily occurs in the first exhaust catalyst 40 than in the second exhaust catalyst 41. Even when the HC poisoning or S poisoning is caused in the first exhaust catalyst 40, the bonded HC or sulfur components are oxidized when the first exhaust catalyst 40 is exposed to an atmosphere having excessive oxygen. Thus, the poisoning may be resolved. In the automatic stop and restart control according to the first embodiment, the stopping motoring is executed at the time of stopping the operation of the internal combustion engine 1. When the stopping motoring is executed in a state where fuel injection of the fuel injection valve 2 is stopped, oxygen is supplied to the first exhaust catalyst 40. Thus, the HC poisoning or S poisoning in the first exhaust catalyst 40 can be resolved. Accordingly, when the internal combustion engine 1 is restarted, since the exhaust control function of the first exhaust catalyst 40 is restored, removal of HC or CO in the first exhaust catalyst 40 can be promoted. The starting motoring is also performed in a state where fuel injection of the fuel injection valve 2 is stopped. Thus, oxygen is supplied to the first exhaust catalyst 40 also when the starting motoring is executed. When the stopping motoring is performed in addition to the starting motoring, more oxygen is supplied to the first exhaust catalyst 40. Thus, the execution of the stopping motoring can further promote resolution of the HC poisoning or S poisoning in the first exhaust catalyst 40.

However, when oxygen is supplied to the first exhaust catalyst 40 by the stopping motoring, an excess of oxygen that is not consumed to resolve the HC poisoning or S poisoning is occluded in the first exhaust catalyst 40. Accordingly, when the stopping motoring is performed in addition to the starting motoring, the oxygen occlusion amount of the first exhaust catalyst 40 is further increased compared to a case where the starting motoring is solely performed. Immediately after the resumption of fuel injection of the fuel injection valve 2 at the restart of the internal combustion engine 1, exhaust gas discharged from the internal combustion engine 1 flows to the first exhaust catalyst 40 while being mixed with air present in the exhaust path 4 on the upstream side of the first exhaust catalyst 40. That is, exhaust gas having a lean air-fuel ratio higher than the stoichiometric air-fuel ratio flows to the first exhaust catalyst 40 of which the oxygen occlusion amount is increased by the stopping motoring. Then, the NOx removal function (NOx reduction function) may not be sufficiently exhibited in the first exhaust catalyst 40 that is a three-way catalyst. In such a case, NOx flows out from the first exhaust catalyst 40.

In the first embodiment, immediately after the restart of the internal combustion engine 1 (immediately after the resumption of fuel injection of the fuel injection valve 2), NOx that flows out from the first exhaust catalyst 40 can be removed by the second exhaust catalyst 41. In order to do so, the ECU 5 executes the stopping motoring in a range in which the oxygen occlusion amount of the first exhaust catalyst 40 which is increased by the stopping motoring becomes an oxygen occlusion amount smaller than an upper limit oxygen occlusion amount of the first exhaust catalyst 40. Specifically, the ECU 5 executes the stopping motoring such that the oxygen occlusion amount of the first exhaust catalyst 40 becomes equal to a target oxygen occlusion amount. In such a case, the target oxygen occlusion amount is set to an amount that is smaller than an amount obtained by subtracting an estimated value (may be referred to as the "starting oxygen supply amount" below) of the amount of oxygen supplied to the first exhaust catalyst 40 by the starting motoring at the restart of the internal combustion engine 1 from the upper limit oxygen occlusion amount of the first exhaust catalyst 40. The starting motoring is performed in a state where the opening degree of the throttle valve 30 is controlled to a predetermined first throttle opening degree. Thus, the starting oxygen supply amount can be estimated as a constant amount.

By executing the stopping motoring as described above, the amount of oxygen supplied to the first exhaust catalyst 40 by the stopping motoring, and the amount of oxygen supplied to the first exhaust catalyst 40 by the starting motoring are occluded in the first exhaust catalyst 40. Thus, a situation where oxygen flows out to the downstream side of the first exhaust catalyst 40 is suppressed. That is, more oxygen is supplied to the first exhaust catalyst 40 in a range in which oxygen does not flow out to the downstream side of the first exhaust catalyst 40. Accordingly, resolution of the HC poisoning or S poisoning in the first exhaust catalyst 40 can be promoted. In addition, an increase in the oxygen occlusion amount of the second exhaust catalyst 41 can be suppressed.

Thus, removal of HC or CO in the first exhaust catalyst 40 immediately after the restart of the internal combustion engine 1 can be promoted. The NOx removal function of the second exhaust catalyst 41 can be further exhibited immediately after the restart of the internal combustion engine 1. Accordingly, immediately after the restart of the internal combustion engine 1, even when the NOx removal function of the first exhaust catalyst 40 is not sufficiently exhibited, NOx that flows out from the first exhaust catalyst 40 can be removed by the second exhaust catalyst 41. Therefore, removal of HC or CO and removal of NOx immediately after the restart of the internal combustion engine 1 can be accomplished at the same time.

Immediately after the resumption of fuel injection of the fuel injection valve 2 by increasing the engine rotational speed of the internal combustion engine 1 to the predetermined rotational speed through the starting motoring, exhaust gas discharged from the internal combustion engine 1 is flows to the first exhaust catalyst 40 in a state of being mixed with air present in the exhaust path 4 on the upstream side of the first exhaust catalyst 40. Thus, exhaust gas having a lean air-fuel ratio flows to the first exhaust catalyst 40. In the first embodiment, the total of the target oxygen occlusion amount in the stopping motoring and the starting oxygen supply amount in the starting motoring is smaller than the upper limit oxygen occlusion amount of the first exhaust catalyst 40. Thus, at least a part of the amount of oxygen included in the exhaust gas of a lean air-fuel ratio flowing to the first exhaust catalyst 40 is occluded in the first exhaust catalyst 40. Therefore, the air-fuel ratio of exhaust gas flowing to the second exhaust catalyst 41 can be set to be lower than the air-fuel ratio of exhaust gas flowing to the first exhaust catalyst 40. The target oxygen occlusion amount in the stopping motoring may be equal to or smaller than an amount obtained by subtracting the total of the starting oxygen supply amount and the amount of air present in the exhaust path 4 on the upstream side of the first exhaust catalyst 40 at the restart of the internal combustion engine 1 from the upper limit oxygen occlusion amount of the first exhaust catalyst 40. Accordingly, oxygen that is included in the exhaust gas of a lean air-fuel ratio flowing to the first exhaust catalyst 40 immediately after the restart of the internal combustion engine 1 is also occluded in the first exhaust catalyst 40.

Control Flow

Figure 2:
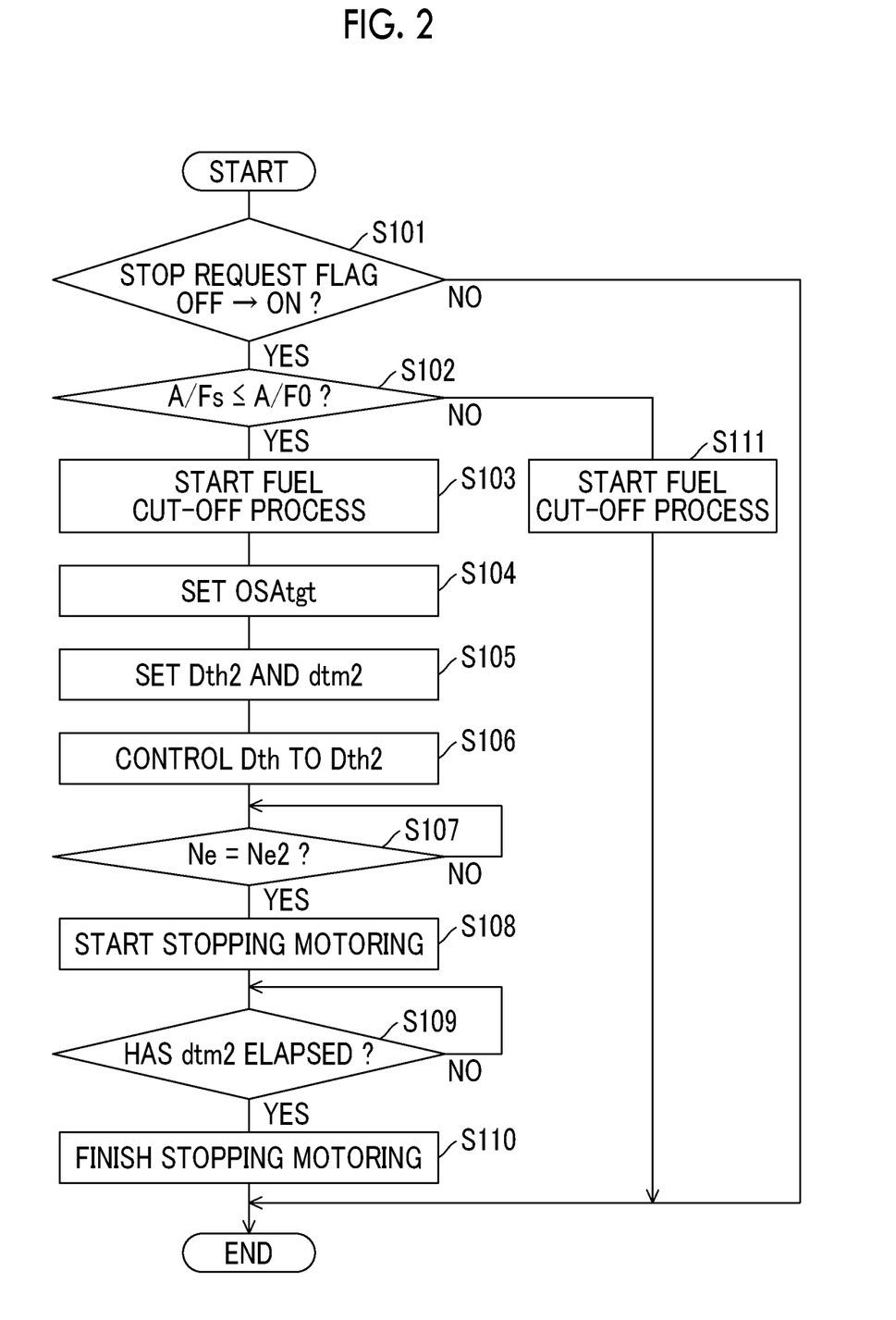
FIG. 2 is a flowchart illustrating a flow when the operation of the internal combustion engine is stopped in an automatic stop and restart control according to a first embodiment.
Figure 3:
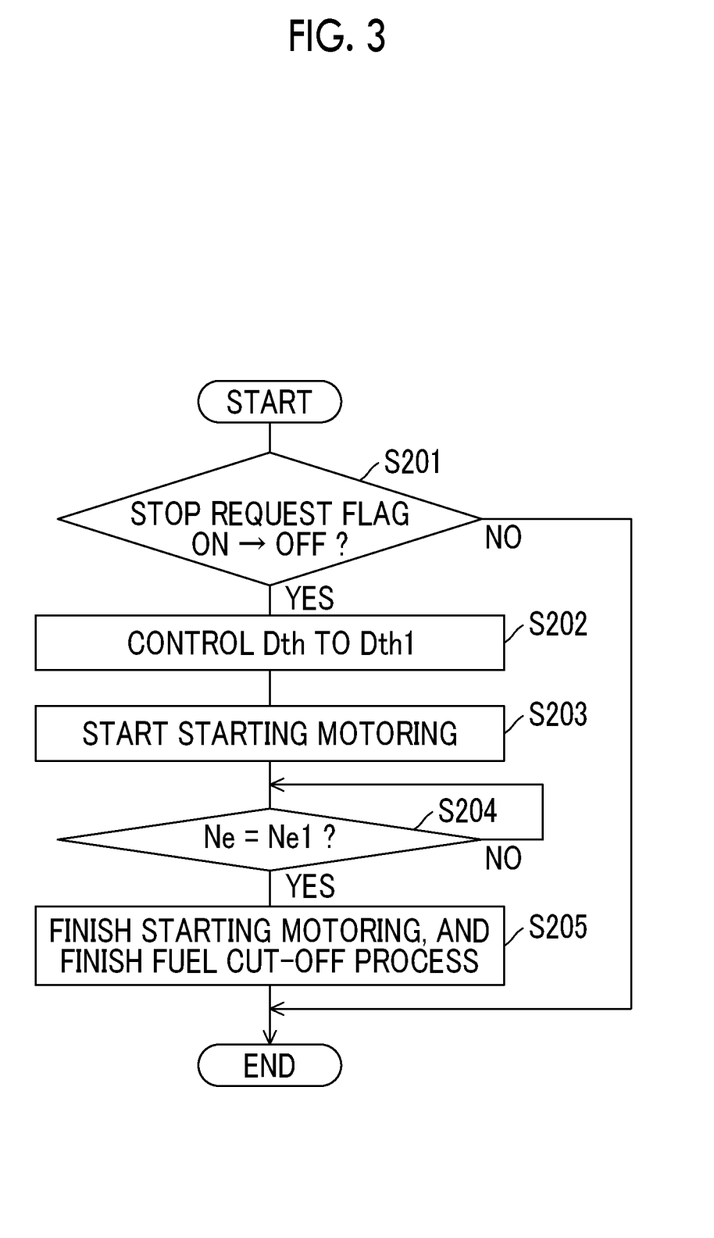
FIG. 3 is a flowchart illustrating a flow when the internal combustion engine is restarted in the automatic stop and restart control according to the first embodiment.

The flow of the automatic stop and restart control according to the first embodiment will be described based on FIG. 2 and FIG. 3. FIG. 2 is a flowchart illustrating a flow when the operation of the internal combustion engine 1 is stopped in the automatic stop and restart control. The flow is executed by the ECU 5 while the internal combustion engine 1 is operated without the fuel cut-off process. FIG. 3 is a flowchart illustrating a flow when the internal combustion engine 1 is restarted in the automatic stop and restart control. The flow is executed by the ECU 5 during the fuel cut-off process.

The flow illustrated in FIG. 2 will be described. In the flow, in S101, a determination as to whether or not a stop request flag is switched to an ON state from an OFF state is performed. The stop request flag is a flag that is set to the ON state when the predetermined operation stop condition is established. In a case where a negative determination is made in S101, the flow is temporarily finished. Meanwhile, in a case where a positive determination is made in S101, the process of S102 is executed.

In S102, a determination as to whether or not a detected value A/Fs of the second air-fuel ratio sensor 43 is equal to or lower than a predetermined threshold air-fuel ratio A/F0 is performed. The value of the predetermined threshold air-fuel ratio A/F0 is set to be equal to or higher than the stoichiometric air-fuel ratio. The oxygen occlusion amount of the first exhaust catalyst 40 may reach the upper limit oxygen occlusion amount of the first exhaust catalyst 40 at the time of establishment of the predetermined operation stop condition. In such a case, since oxygen flows out from the first exhaust catalyst 40, the air-fuel ratio of exhaust gas detected by the second air-fuel ratio sensor 43 becomes higher than the stoichiometric air-fuel ratio. Thus, in a case where the detected value A/Fs of the second air-fuel ratio sensor 43 at the time of establishment of the predetermined operation stop condition is higher than the predetermined threshold air-fuel ratio A/F0, a determination can be made that the oxygen occlusion amount of the first exhaust catalyst 40 has reached the upper limit oxygen occlusion amount of the first exhaust catalyst 40. In such a case, when the stopping motoring is executed after the start of the fuel cut-off process, oxygen is supplied to the second exhaust catalyst 41. In a case where a negative determination is made in S102, the fuel cut-off process is started in S111. That is, fuel injection of the fuel injection valve 2 in the internal combustion engine 1 is stopped. After the process of S111, the flow is temporarily finished. That is, in a case where a negative determination is made in S102, the stopping motoring is not performed after the start of the fuel cut-off process.

Meanwhile, in a case where a positive determination is made in S102, the fuel cut-off process is started in S103. In S104, a target oxygen occlusion amount OSAtgt in the stopping motoring is set. As described above, the target oxygen occlusion amount OSAtgt is set to an amount smaller than an amount obtained by subtracting the starting oxygen supply amount from the upper limit oxygen occlusion amount of the first exhaust catalyst 40. The upper limit oxygen occlusion amount of the first exhaust catalyst 40 changes depending on the temperature of the first exhaust catalyst 40. Thus, in S104, the upper limit oxygen occlusion amount of the first exhaust catalyst 40 is calculated based on the temperature of the first exhaust catalyst 40 at the time of starting the fuel cut-off process. A correlation between the temperature of the first exhaust catalyst 40 and the upper limit oxygen occlusion amount of the first exhaust catalyst 40 can be acquired by experiment and the like. The correlation is stored in advance in the ECU 5 as a map or a function. The ECU 5 calculates the upper limit oxygen occlusion amount of the first exhaust catalyst 40 using the map or the function. As described above, the starting oxygen supply amount can be estimated as a constant amount. Thus, the starting oxygen supply amount is acquired by experiment and the like, and is stored in advance in the ECU 5. In S104, the ECU 5 calculates the target oxygen occlusion amount OSAtgt using the calculated upper limit oxygen occlusion amount of the first exhaust catalyst 40 and the starting oxygen supply amount. In such a case, as described above, the target oxygen occlusion amount OSAtgt may be calculated by considering the amount of air present in the exhaust path 4 on the upstream side of the first exhaust catalyst 40 at the restart of the internal combustion engine 1. The amount of air present in the exhaust path 4 on the upstream side of the first exhaust catalyst 40 can be estimated as a constant amount based on the capacity of the part of the exhaust path 4 where air is present.

In S105, a second throttle opening degree Dth2 and a second duration dtm2 that are parameters related to the stopping motoring are set. The second throttle opening degree Dth2 is the opening degree of the throttle valve 30 in the stopping motoring. The second duration dtm2 is the duration of the stopping motoring. In the first embodiment, an engine rotational speed Ne (motoring rotational speed) of the internal combustion engine 1 in the stopping motoring is set to be constant at a predetermined second rotational speed Ne2.

The stopping motoring is executed such that the oxygen occlusion amount of the first exhaust catalyst 40 becomes equal to the target oxygen occlusion amount OSAtgt set in S104. In order to do so, in S104, the ECU 5 calculates the difference (may be referred to as an "oxygen occlusion amount difference" below) between the target oxygen occlusion amount OSAtgt and the oxygen occlusion amount of the first exhaust catalyst 40 at the time of starting the fuel cut-off process. The stopping motoring is started after the engine rotational speed Ne of the internal combustion engine 1 is decreased to the second rotational speed Ne2 after the start of the fuel cut-off process. In such a case, oxygen is supplied to the first exhaust catalyst 40 even during a period (may be referred to as a "pre-motoring period" below) in which the engine rotational speed Ne of the internal combustion engine 1 is decreased to the second rotational speed Ne2 after the start of the fuel cut-off process. The amount of oxygen newly occluded in the first exhaust catalyst 40 during the pre-motoring period (that is, the amount of increase in oxygen occlusion amount of the first exhaust catalyst 40 during the pre-motoring period) is increased as the engine rotational speed (may be referred to as an "injection stopping rotational speed" below) of the internal combustion engine 1 at the time of starting the fuel cut-off process is increased. Thus, when the oxygen occlusion amount difference is constant, the amount of oxygen occluded in the first exhaust catalyst 40 by the stopping motoring needs to be decreased as the amount of increase in oxygen occlusion amount of the first exhaust catalyst 40 during the pre-motoring period is increased.

The amount of oxygen occluded in the first exhaust catalyst 40 by the stopping motoring is increased as either the second throttle opening degree Dth2 is increased, or the second duration dtm2 is increased. In S104, the ECU 5 sets the second throttle opening degree Dth2 and the second duration dtm2 based on the oxygen occlusion amount difference and the injection stopping rotational speed such that the oxygen occlusion amount of the first exhaust catalyst 40 becomes equal to the target oxygen occlusion amount OSAtgt after the stopping motoring. In such a case, for example, the value of the second throttle opening degree Dth2 is set to be higher as the oxygen occlusion amount difference is increased. The value of the second duration dtm2 is set to be higher as the oxygen occlusion amount difference is increased. The value of the second throttle opening degree Dth2 is set to be lower as the injection stopping rotational speed is increased. The value of the second duration dtm2 is set to be lower as the injection stopping rotational speed is increased. Such a correlation of the second throttle opening degree Dth2 and the second duration dtm2 with the oxygen occlusion amount difference and the injection stopping rotational speed can be determined in advance by experiment and the like. The correlation of the parameters is stored in advance in the ECU 5 as a map or a function. The ECU 5 calculates the second throttle opening degree Dth2 and the second duration dtm2 using the map or the function.

In S106, an opening degree Dth of the throttle valve 30 is controlled to the second throttle opening degree Dth2 set in S105. In S107, a determination as to whether or not the engine rotational speed Ne of the internal combustion engine 1 has decreased to the second rotational speed Ne2 is performed. In a case where a negative determination is made in S107, the process of S107 is executed again. Meanwhile, in a case where a positive determination is made in S107, the process of S108 is executed. In S108, the stopping motoring is started using the starter motor 100. Accordingly, the engine rotational speed Ne of the internal combustion engine 1 is maintained at the second rotational speed Ne2.

In S109, a determination as to whether or not the second duration dtm2 has elapsed from the start of the stopping motoring in S108 is performed. In a case where a negative determination is made in S109, the process of S109 is executed again. Meanwhile, in a case where a positive determination is made in S109, the process of S110 is executed. In S110, the stopping motoring is finished by stopping driving of the starter motor 100. Then, the flow is finished. Even after the stopping motoring is finished, oxygen is supplied to the first exhaust catalyst 40 for a moment (that is, while the crankshaft of the internal combustion engine 1 rotates by inertia force). However, the oxygen occlusion amount of the first exhaust catalyst 40 reaches the target oxygen occlusion amount OSAtgt at the time when the supplying of oxygen to the first exhaust catalyst 40 is finished by finishing the stopping motoring at the timing described above.

In the flow, the engine rotational speed Ne (motoring rotational speed) of the internal combustion engine 1 in the stopping motoring is set to be constant at the second rotational speed Ne2. However, the amount of oxygen supplied to the first exhaust catalyst 40 by the stopping motoring can also be increased or decreased by changing the engine rotational speed of the internal combustion engine 1 in the stopping motoring. Instead of the second throttle opening degree Dth2 and the second duration dtm2, or in addition to those parameters, the engine rotational speed of the internal combustion engine 1 in the stopping motoring may be set to be variable such that the oxygen occlusion amount of the first exhaust catalyst 40 becomes equal to the target oxygen occlusion amount OSAtgt.

The flow illustrated in FIG. 3 will be described. In the flow, in S201, a determination as to whether or not the stop request flag is switched to the OFF state from the ON state is performed. The stop request flag is set to the OFF state when the predetermined restart condition is established. In a case where a negative determination is made in S201, the flow is temporarily finished. Meanwhile, in a case where a positive determination is made in S201, the process of S202 is executed.

In S202, the opening degree Dth of the throttle valve 30 is controlled to a first throttle opening degree Dth1. In S203, the starting motoring is started using the starter motor 100. In S204, a determination as to whether or not the engine rotational speed Ne of the internal combustion engine 1 has increased to a first rotational speed Ne1 is performed. In a case where a negative determination is made in S204, the process of S204 is executed again. Meanwhile, in a case where a positive determination is made in S204, the process of S205 is executed.

In S205, the starting motoring is finished by stopping driving of the starter motor 100, and the fuel cut-off process is finished. Then, the flow is finished. The starting motoring may continue until a determination is made that the internal combustion engine 1 has started completely after the end of the fuel cut-off process, that is, after the resumption of fuel injection of the fuel injection valve 2 in the internal combustion engine 1.

As described above, immediately after the end of the fuel cut-off process, that is, immediately after the resumption of fuel injection of the fuel injection valve 2, exhaust gas having a lean air-fuel ratio flows to the first exhaust catalyst 40. In the first embodiment, an injection amount increasing process that increases the fuel injection amount to be above an amount corresponding to a requested engine load is executed immediately after the resumption of fuel injection of the fuel injection valve 2. By executing the injection amount increasing process, more fuel is supplied to the first exhaust catalyst 40 immediately after the resumption of fuel injection of the fuel injection valve 2. Thus, by promptly consuming oxygen occluded in the first exhaust catalyst 40, the air-fuel ratio in the first exhaust catalyst 40 can be promptly decreased to approximately the stoichiometric air-fuel ratio. Consequently, the NOx removal function of the first exhaust catalyst 40 can be exhibited. By executing the injection amount increasing process, the air-fuel ratio of exhaust gas that flows to the second exhaust catalyst 41 immediately after the resumption of fuel injection of the fuel injection valve 2 can be further decreased. Thus, the NOx removal function of the second exhaust catalyst 41 can be further exhibited.

Timing Chart

Figure 4:
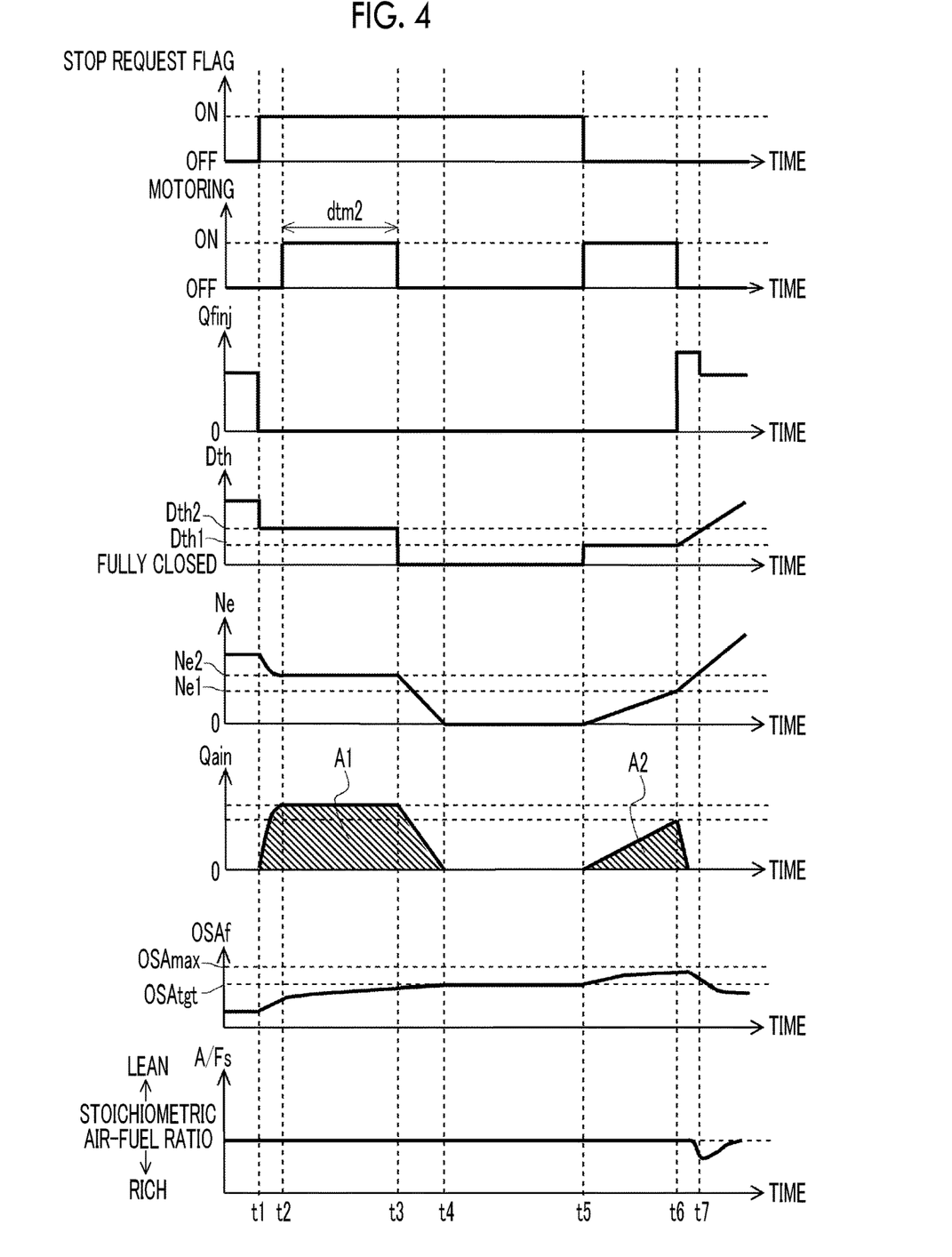
FIG. 4 is a timing chart illustrating a temporal change in each of a stop request flag, motoring, a fuel injection amount, a throttle valve opening degree, an engine rotational speed, the amount of inflowing air, the oxygen occlusion amount of a first exhaust catalyst, and a detected value of a second air-fuel ratio sensor when the automatic stop and restart control according to the first embodiment is executed.

A temporal change in each parameter at the time of executing the automatic stop and restart control according to the first embodiment will be described based on FIG. 4. FIG. 4 is a timing chart illustrating a temporal change in each of the stop request flag, motoring, a fuel injection amount Qfinj of the fuel injection valve 2, the opening degree Dth of the throttle valve 30, the engine rotational speed Ne of the internal combustion engine 1, a flow rate Qain of air flowing to the first exhaust catalyst 40 (may be referred to as an "inflowing air amount" below), an oxygen occlusion amount OSAf of the first exhaust catalyst 40, and the detected value A/Fs of the second air-fuel ratio sensor 43 when the automatic stop and restart control according to the first embodiment is executed.

In FIG. 4, at time t1, the stop request flag is switched to the ON state from the OFF state. Accordingly, at time t1, fuel injection of the fuel injection valve 2 is stopped (the fuel injection amount Qfinj becomes equal to zero). Thus, the engine rotational speed Ne of the internal combustion engine 1 starts to decrease from time t1. Meanwhile, the inflowing air amount starts to increase from time t1. Accordingly, the oxygen occlusion amount OSAf of the first exhaust catalyst 40 is increased after time t1. At time t1, the opening degree Dth of the throttle valve 30 is controlled to the second throttle opening degree Dth2.

At time t2, when the engine rotational speed Ne of the internal combustion engine 1 is decreased to the second rotational speed Ne2, the stopping motoring is started. Accordingly, the engine rotational speed Ne of the internal combustion engine 1 is maintained at the second rotational speed Ne2 after time t2. The inflowing air amount is also maintained at the amount at time t2. Consequently, the oxygen occlusion amount OSAf of the first exhaust catalyst 40 is increased even after time t2. The period from time t1 to time t2 corresponds to the pre-motoring period.

At time t3 at which the second duration dtm2 has elapsed from time t2, the stopping motoring is finished. Consequently, the engine rotational speed Ne of the internal combustion engine 1 is gradually decreased after time t3. Accordingly, the inflowing air amount is also gradually decreased. At time t3, the throttle valve 30 is fully closed (the opening degree Dth of the throttle valve 30 becomes equal to zero). However, the throttle valve 30 does not need to be fully closed at time t3. That is, the opening degree Dth of the throttle valve 30 may be maintained at the second throttle opening degree Dth2 even after time t3. The opening degree Dth of the throttle valve 30 may also be controlled to the first throttle opening degree Dth1 at time t3.

At time t4, when the engine rotational speed Ne of the internal combustion engine 1 becomes equal to zero, the inflowing air amount also becomes equal to zero. In the first embodiment, the oxygen occlusion amount OSAf of the first exhaust catalyst 40 reaches the target oxygen occlusion amount OSAtgt at time t4. The area of the part illustrated by hatching A1 in the graph illustrating a change in inflowing air amount in FIG. 4 corresponds to the total of the amount of oxygen occluded in the first exhaust catalyst 40 during the pre-motoring period and the amount of oxygen occluded in the first exhaust catalyst 40 by the stopping motoring.

In FIG. 4, at time t5, the stop request flag is switched to the OFF state from the ON state. Accordingly, at time t5, the opening degree Dth of the throttle valve 30 is controlled to the first throttle opening degree Dth1, and the starting motoring is started. Thus, the engine rotational speed Ne of the internal combustion engine 1 starts to increase from time t5. The inflowing air amount starts to increase from time t5. Consequently, the oxygen occlusion amount OSAf of the first exhaust catalyst 40 is increased to be larger than the target oxygen occlusion amount OSAtgt after time t5.

At time t6, when the engine rotational speed Ne of the internal combustion engine 1 reaches the first rotational speed Ne1, fuel injection of the fuel injection valve 2 is resumed, and the starting motoring is finished. The injection amount increasing process is executed during the period from time t6 to time t7 immediately after the resumption of fuel injection. Thus, the fuel injection amount Qfinj during the period from time t6 to time t7 is larger than that after time t7. After time t6, the opening degree Dth of the throttle valve 30 is gradually increased. Accordingly, the engine rotational speed Ne of the internal combustion engine 1 is gradually increased.

As described above, even when the starting motoring is finished at time t6, air that is present in the exhaust path 4 on the upstream side of the first exhaust catalyst 40 flows to the first exhaust catalyst 40 while being mixed with exhaust gas discharged from the internal combustion engine 1 immediately after the end of the starting motoring. Thus, the inflowing air amount becomes equal to zero at a time after time t6. The area of the part illustrated by hatching A2 in the graph illustrating a change in inflowing air amount in FIG. 4 corresponds to the total of the amount of oxygen occluded in the first exhaust catalyst 40 by the starting motoring and the amount of air present in the exhaust path 4 on the upstream side of the first exhaust catalyst 40 at time t6 (that is, the amount of oxygen flowing to the first exhaust catalyst 40 along with exhaust gas immediately after the resumption of fuel injection).

In the first embodiment, even when the oxygen occlusion amount OSAf of the first exhaust catalyst 40 is increased to be larger than the target oxygen occlusion amount OSAtgt after time t5, the oxygen occlusion amount OSAf of the first exhaust catalyst 40 is maintained at an amount smaller than an upper limit oxygen occlusion amount OSAmax of the first exhaust catalyst 40. Thus, a situation where oxygen flows out from the first exhaust catalyst 40 is suppressed. Therefore, the detected value A/Fs of the second air-fuel ratio sensor 43 is maintained at the stoichiometric air-fuel ratio during the period from time t1 to time t6. Accordingly, a situation where oxygen is supplied to the second exhaust catalyst 41 is suppressed. In FIG. 4, in a period before and after time t7, the detected value A/Fs of the second air-fuel ratio sensor 43 is temporarily decreased to be lower than the stoichiometric air-fuel ratio due to the injection amount increasing process executed during the period from time t6 to time t7.

As described thus far, in the first embodiment, more oxygen can be supplied to the first exhaust catalyst 40 in a range in which oxygen does not flow out to the downstream side of the first exhaust catalyst 40. Accordingly, resolution of the HC poisoning or S poisoning in the first exhaust catalyst 40 can be promoted. Thus, removal of HC or CO in the first exhaust catalyst 40 immediately after the restart of the internal combustion engine 1 can be promoted. Even when the stopping motoring and the starting motoring are executed, an increase in the oxygen occlusion amount of the second exhaust catalyst 41 is suppressed. Thus, the NOx removal function of the second exhaust catalyst 41 can be further exhibited immediately after the restart of the internal combustion engine 1. The stopping and restarting the operation of the internal combustion engine 1 is very frequently performed in the internal combustion engine 1 where the automatic stop and restart control is executed. In the first embodiment, removal of HC or CO and removal of NOx immediately after the restart of the internal combustion engine 1 performed very frequently can be accomplished at the same time.

In the first embodiment, the ECU 5 executes motoring by driving the starter motor 100. In the first embodiment, the ECU 5 executes the automatic stop and restart control.

Modification Example

In the embodiment, the target oxygen occlusion amount in the stopping motoring is set to an amount smaller than the amount obtained by subtracting the starting oxygen supply amount in the starting motoring from the upper limit oxygen occlusion amount of the first exhaust catalyst 40. However, the target oxygen occlusion amount is not limited to such a value. That is, the target oxygen occlusion amount may be at least an amount smaller than the upper limit oxygen occlusion amount of the first exhaust catalyst 40. When the target oxygen occlusion amount is set to such an amount, at least the amount of oxygen supplied to the first exhaust catalyst 40 by the stopping motoring is occluded in the first exhaust catalyst 40. Thus, an increase in the oxygen occlusion amount of the second exhaust catalyst 41 caused by the stopping motoring can be suppressed. Accordingly, immediately after the restart of the internal combustion engine 1, NOx that flows out from the first exhaust catalyst 40 can be removed by the second exhaust catalyst 41 compared to a case where the oxygen occlusion amount of the second exhaust catalyst 41 is increased by the stopping motoring.

Second Embodiment

An automatic stop and restart control according to a second embodiment will be described based on its difference with respect to the first embodiment. When the stopping motoring is executed at the time of stopping the operation of the internal combustion engine 1, oxygen is supplied to the first exhaust catalyst 40. In such a case, when the temperature of the first exhaust catalyst 40 is relatively high, oxidation reactions may rapidly occur in the first exhaust catalyst 40, and the temperature of the first exhaust catalyst 40 may be excessively increased. In a case where the temperature of the first exhaust catalyst 40 is relatively high, it is highly likely that the HC poisoning or S poisoning in the first exhaust catalyst 40 is resolved. In such a case, oxygen may not need to be supplied to the first exhaust catalyst 40 by the stopping motoring. In the second embodiment, an ECU 10 decides whether or not to execute the stopping motoring based on the temperature of the first exhaust catalyst 40 at the time of starting the fuel cut-off process.

Figure 5:
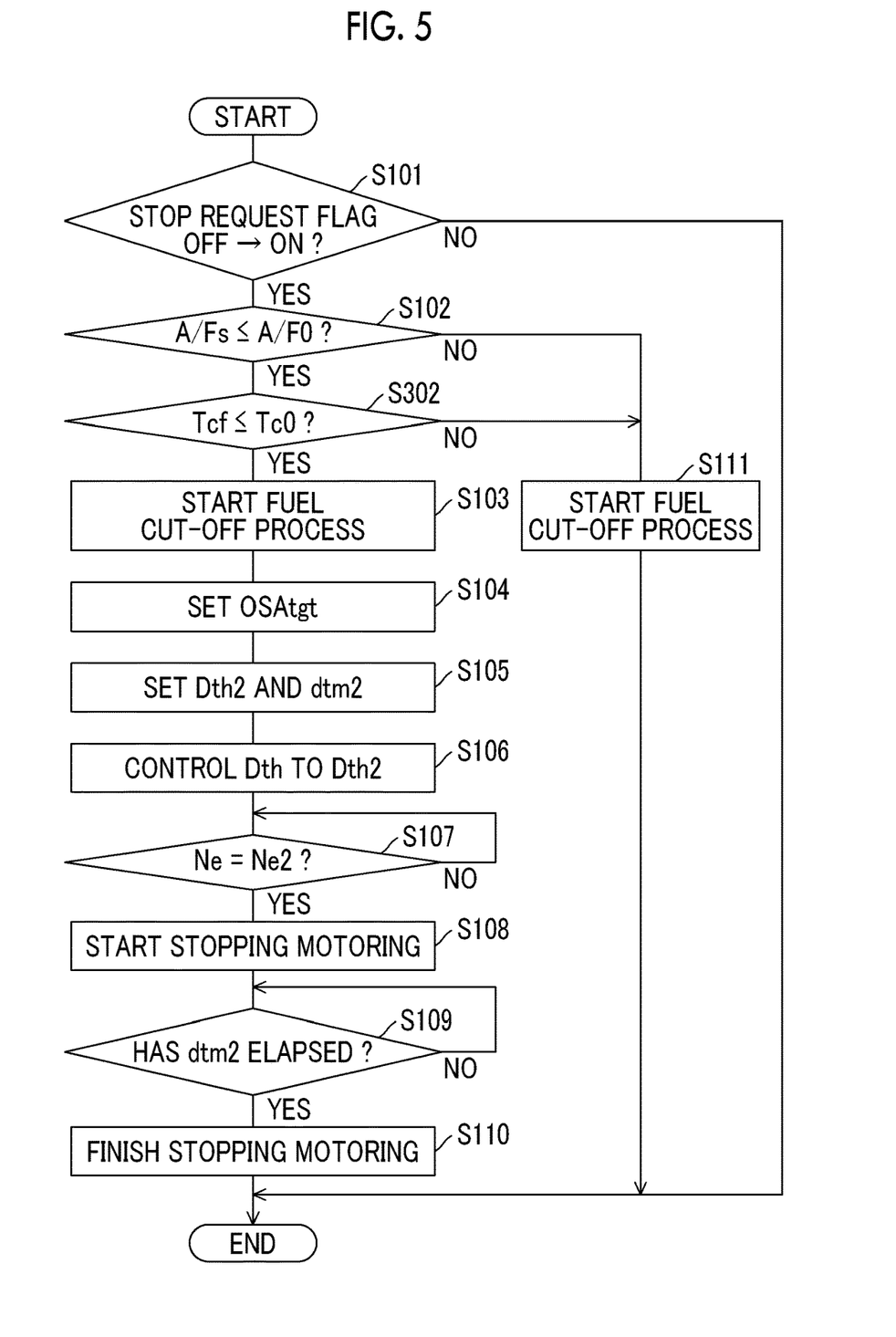
FIG. 5 is a flowchart illustrating a flow when the operation of the internal combustion engine is stopped in an automatic stop and restart control according to a second embodiment.

FIG. 5 is a flowchart illustrating a flow when the operation of the internal combustion engine 1 is stopped in the automatic stop and restart control according to the second embodiment. In the flow, the processes of steps other than S302 are the same as the processes of steps designated by the same numbers in the flow illustrated in FIG. 2. Thus, descriptions of the steps other than S302 will not be repeated.

In the flow, in a case where a positive determination is made in S102, the process of S302 is executed. In S302, a determination as to whether or not a temperature Tcf of the first exhaust catalyst 40 is equal to or lower than a predetermined temperature Tc0 is performed. The predetermined temperature Tc0 is a temperature at which a determination can be made that the temperature of the first exhaust catalyst 40 is not excessively increased even when oxygen is supplied to the first exhaust catalyst 40 by the stopping motoring. The predetermined temperature Tc0 can be acquired by experiment and the like. In a case where a positive determination is made in S302, the process of S103 is executed. Meanwhile, in a case where a negative determination is made in S302, the process of S111 is executed.

In the flow, in a case where the temperature Tcf of the first exhaust catalyst 40 at the time of starting the fuel cut-off process is higher than the predetermined temperature Tc0 (that is, in a case where a negative determination is made in S302), the stopping motoring is not executed. Accordingly, a situation where the temperature of the first exhaust catalyst 40 is excessively increased by the stopping motoring can be suppressed.

Third Embodiment

An automatic stop and restart control according to a third embodiment will be described based on its difference with respect to the first and second embodiments. Even when the stopping motoring is executed after the target oxygen occlusion amount is set to an amount smaller than the amount obtained by subtracting the starting oxygen supply amount from the upper limit oxygen occlusion amount of the first exhaust catalyst 40, due to disturbance and the like, oxygen may flow out from the first exhaust catalyst 40 in actuality by the stopping motoring or the starting motoring before the resumption of fuel injection of the fuel injection valve 2 (that is, during the fuel cut-off process). In such a case, since oxygen is supplied to the second exhaust catalyst 41, the oxygen occlusion amount of the second exhaust catalyst 41 is increased. Accordingly, in such a case, the NOx removal performance of the second exhaust catalyst 41 may be decreased immediately after the resumption of fuel injection of the fuel injection valve 2. In the third embodiment, in a case where oxygen flows out from the first exhaust catalyst 40 during the fuel cut-off process, the amount of increase in fuel injection amount in the injection amount increasing process executed immediately after the end of the fuel cut-off process is increased.

Figure 6:
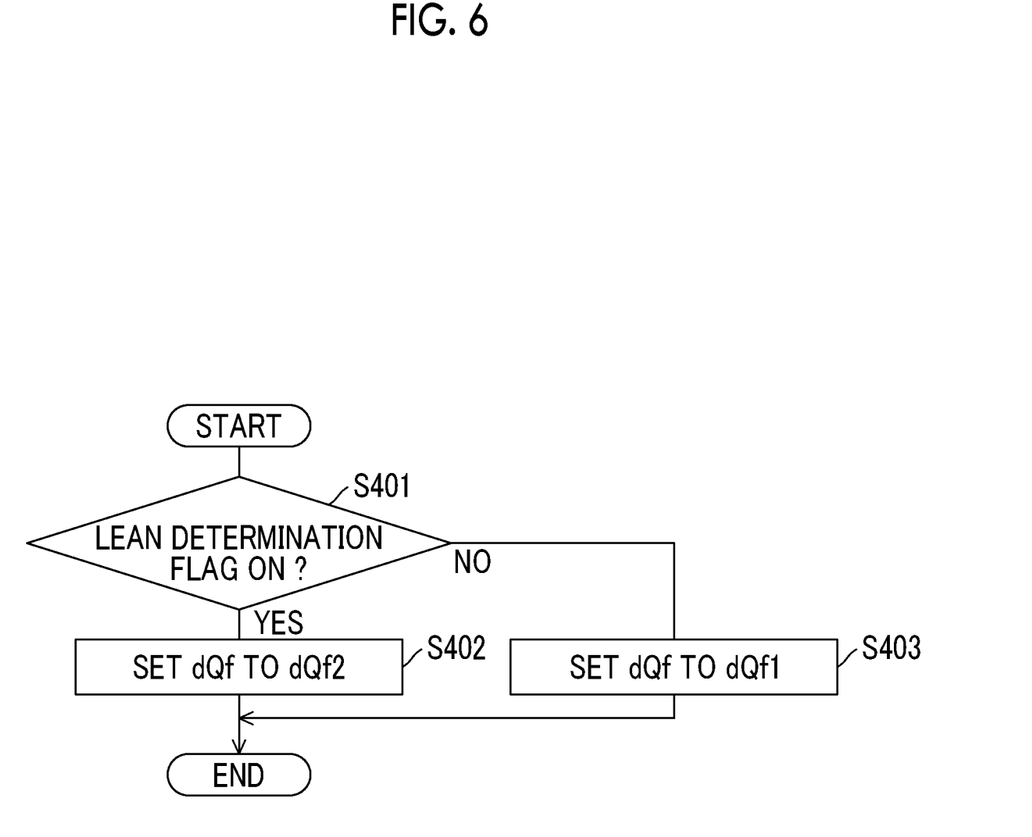
FIG. 6 is a flowchart illustrating a flow when the amount of increase in fuel injection amount is set in an injection amount increasing process according to a third embodiment.

FIG. 6 is a flowchart illustrating a flow when the amount of increase in fuel injection amount is set in an injection amount increasing process according to the third embodiment. The flow is executed by the ECU 5 at a timing when the fuel cut-off process is finished. In the flow, in S401, a determination as to whether or not a lean determination flag is in an ON state is performed. The lean determination flag is a flag that is switched to an ON state from an OFF state in a case where the detected value A/Fs of the second air-fuel ratio sensor 43 becomes higher than the predetermined threshold air-fuel ratio A/F0 during the fuel cut-off process. As described above, the value of the predetermined threshold air-fuel ratio A/F0 is set to be equal to or higher than the stoichiometric air-fuel ratio.

In a case where a negative determination is made in S401, in S403, an amount of increase dQf in fuel injection amount in the injection amount increasing process is set to a first amount of increase dQf1 that is a reference value. Meanwhile, in a case where a positive determination is made in S401, a determination can be made that oxygen flows out from the first exhaust catalyst 40 during the fuel cut-off process. In such a case, in S402, the amount of increase dQf in fuel injection amount in the injection amount increasing process is set to a second amount of increase dQf2 that is larger than the first amount of increase dQf1. When the process of S402 is executed, the lean determination flag is switched to the OFF state from the ON state. When the amount of increase in fuel injection amount in the injection amount increasing process is set in S402 or S403, the injection amount increasing process is executed in accordance with the set amount of increase.

In the flow, in a case where the oxygen occlusion amount of the second exhaust catalyst 41 is increased due to oxygen flowing out from the first exhaust catalyst 40 during the fuel cut-off process, the amount of increase in fuel injection amount in the injection amount increasing process is larger than that of a case where oxygen does not flow out from the first exhaust catalyst 40. Accordingly, the air-fuel ratio of exhaust gas that flows to the second exhaust catalyst 41 immediately after the resumption of fuel injection of the fuel injection valve 2 is further decreased. Therefore, in a case where oxygen flows out from the first exhaust catalyst 40 during the fuel cut-off process, removal of NOx in the second exhaust catalyst 41 immediately after the restart of the internal combustion engine 1 can be promoted.

In the third embodiment, the fuel injection amount immediately after the resumption of fuel injection in the internal combustion engine is set by the ECU 5 executing the flow illustrated in FIG. 6.

In a case where the second air-fuel ratio sensor 43 is not activated during the fuel cut-off process, whether or not oxygen flows out from the first exhaust catalyst 40 during the fuel cut-off process cannot be confirmed. Thus, the amount of increase in fuel injection amount in the injection amount increasing process cannot be set using the flow illustrated in FIG. 6. In a case where the second air-fuel ratio sensor 43 is not activated during the fuel cut-off process, the value of the target oxygen occlusion amount in the stopping motoring may be set to be lower than that of a case where the second air-fuel ratio sensor 43 is activated. Accordingly, the possibility of oxygen flowing out from the first exhaust catalyst 40 during the fuel cut-off process can be reduced.

In a case where the second air-fuel ratio sensor 43 is not activated during the fuel cut-off process, oxygen may intentionally be supplied to the second exhaust catalyst 41 by controlling each parameter such that the amount of oxygen supplied to the first exhaust catalyst 40 by the stopping motoring is increased compared to a case where the second air-fuel ratio sensor 43 is activated. In such a case, also the amount of increase in fuel injection amount in the injection amount increasing process immediately after the end of the fuel cut-off process is increased compared to a case where the second air-fuel ratio sensor 43 is activated. Accordingly, resolution of the HC poisoning or S poisoning not only in the first exhaust catalyst 40 but also in the second exhaust catalyst 41 can be promoted as far as possible.

Other Embodiments

In a hybrid vehicle that can be driven using at least one of an internal combustion engine or an electric motor, the operation of the internal combustion engine is stopped or restarted when the drive source is switched. The present disclosure may be applied to a control system for the internal combustion engine mounted in the hybrid vehicle. In the hybrid vehicle, the crankshaft of the internal combustion engine can be rotated using the electric motor as the drive source. Thus, motoring may be performed using the electric motor as the drive source. In a case where the hybrid vehicle includes not only the driving electric motor but also an electric power generating motor that generates electric power using the rotation of the crankshaft of the internal combustion engine, motoring may be performed using the electric power generating motor.

What is claimed is:

1. A control system for an internal combustion engine including a first exhaust catalyst that is a three-way catalyst disposed in an exhaust path of the internal combustion engine, a second exhaust catalyst that is a three-way catalyst disposed in the exhaust path on a downstream side of the first exhaust catalyst, and a motor configured to drive the internal combustion engine, the control system comprising
an electronic control unit configured to:
when operation of the internal combustion engine is stopped, stop fuel injection to the internal combustion engine and then, execute motoring in which the internal combustion engine is rotationally driven using drive power of the motor; and
execute the motoring in a range in which an oxygen occlusion amount of the first exhaust catalyst becomes an oxygen occlusion amount smaller than an upper limit oxygen occlusion amount of the first exhaust catalyst.

2. The control system according to claim 1, wherein the electronic control unit is configured to:
when the operation of the internal combustion engine is stopped, prohibit the motoring in a case where a temperature of the first exhaust catalyst at a time of the stoppage of fuel injection to the internal combustion engine is higher than a predetermined temperature.

3. The control system according to claim 1, wherein:
the electronic control unit is configured to:
when the internal combustion engine is restarted after the stoppage of the operation of the internal combustion engine, execute the motoring such that an engine rotational speed of the internal combustion engine is increased to a predetermined rotational speed before resumption of fuel injection to the internal combustion engine;
when the operation of the internal combustion engine is stopped, execute the motoring such that the oxygen occlusion amount of the first exhaust catalyst becomes equal to a target oxygen occlusion amount; and
set the target oxygen occlusion amount to an amount smaller than an amount that is obtained by subtracting an estimated value of an amount of oxygen supplied to the first exhaust catalyst by the motoring executed at the restart of the internal combustion engine from the upper limit oxygen occlusion amount of the first exhaust catalyst.

4. The control system according to claim 3, wherein:
the internal combustion engine includes an air-fuel ratio sensor that detects an air-fuel ratio of gas in the exhaust path on the downstream side of the first exhaust catalyst and an upstream side of the second exhaust catalyst; and
the electronic control unit is configured to:
in a case where the air-fuel ratio of gas detected by the air-fuel ratio sensor, during a period from the stoppage of fuel injection to the resumption of fuel injection to the internal combustion engine upon the restart of the internal combustion engine, becomes higher than a predetermined threshold air-fuel ratio of a value equal to or higher than a stoichiometric air-fuel ratio,
set a fuel injection amount immediately after the resumption of fuel injection to the internal combustion engine to an amount larger than a fuel injection amount immediately after the resumption of fuel injection to the internal combustion engine in a case where the air-fuel ratio of gas detected by the air-fuel ratio sensor during the period is maintained at the predetermined threshold air-fuel ratio or lower.

5. The control system according to claim 1, wherein the electronic control unit is configured to:
stop the operation of the internal combustion engine in a case where a predetermined operation stop condition is established; and
restart the internal combustion engine in a case where a predetermined restart condition is established after the stoppage of the operation of the internal combustion engine.

* * * * *